(12) United States Patent
Patterson et al.

(10) Patent No.: US 7,657,615 B1
(45) Date of Patent: Feb. 2, 2010

(54) APPROACH FOR PROVISIONING NETWORK DEVICES

(75) Inventors: Martin Patterson, Menlo Park, CA (US); Jayaraman Manni, Santa Clara, CA (US); Shriram Krishnan, Oakland, CA (US); Benjamin H. Stoltz, Mountain View, CA (US); Christopher T. La, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1207 days.

(21) Appl. No.: 10/731,889

(22) Filed: Dec. 8, 2003

Related U.S. Application Data (60) Provisional application No. 60/431,813, filed on Dec. 8, 2002.

(51) Int. Cl.
*G06F 15/177* (2006.01)
(52) U.S. Cl. ..................................... 709/221
(58) Field of Classification Search ................. 709/220, 709/221, 222, 231; 713/2, 100
See application file for complete search history.

(56) References Cited

U.S. PATENT DOCUMENTS

| | | | |
|---|---|---|---|
| 5,898,891 A | 4/1999 | Meyer | |
| 6,085,238 A * | 7/2000 | Yuasa et al. | 709/223 |
| 6,219,699 B1 * | 4/2001 | McCloghrie et al. | 709/221 |
| 6,223,218 B1 * | 4/2001 | Iijima et al. | 709/221 |
| 6,601,167 B1 | 7/2003 | Gibson et al. | |
| 6,658,562 B1 | 12/2003 | Bonomo et al. | |
| 6,687,819 B1 | 2/2004 | Aguilar et al. | |
| 6,697,924 B2 | 2/2004 | Swank | |
| 6,704,840 B2 | 3/2004 | Nalawadi et al. | |
| 6,754,679 B2 | 6/2004 | Oheda | |
| 6,775,230 B1 | 8/2004 | Watanabe et al. | |
| 6,895,461 B1 | 5/2005 | Thompson | |
| 6,954,852 B2 * | 10/2005 | Burokas et al. | 713/2 |
| 7,054,924 B1 * | 5/2006 | Harvey et al. | 709/220 |
| 7,069,428 B2 * | 6/2006 | Miyamoto et al. | 713/1 |
| 7,194,538 B1 | 3/2007 | Rabe et al. | |
| 7,197,545 B1 | 3/2007 | Davie | |
| 7,200,610 B1 | 4/2007 | Prawdiuk et al. | |
| 7,210,068 B1 | 4/2007 | Aiello et al. | |
| 7,216,184 B2 | 5/2007 | Milner et al. | |
| 7,321,936 B2 * | 1/2008 | Zimmerman et al. | 709/231 |
| 7,506,151 B2 * | 3/2009 | Miyamoto et al. | 713/2 |

(Continued)

*Primary Examiner*—Andrew Caldwell
*Assistant Examiner*—Benjamin Ailes
(74) *Attorney, Agent, or Firm*—Osha • Liang LLP (57) ABSTRACT

An approach for provisioning network devices generally involves supplying boot data to network devices over a network so that the network devices can be booted up in an imaging mode or an application mode, depending upon the particular boot data supplied to the network device. When booted up in the imaging mode, imaging data can be downloaded and stored on network devices. When booted up in the application mode, the network devices execute one or more programs contained in the image data stored on the network devices. The first and second boot data may be in the form of boot loader scripts. Furthermore, the first and second boot data may be provided to the network device in the payload of a dynamic host configuration protocol (DHCP) reply. The DHCP reply may be generated and provided by a DHCP server to the network device in response to receiving a DHCP request from the network device. The approach may be implemented using a secure network environment.

21 Claims, 4 Drawing Sheets

U.S. PATENT DOCUMENTS

| | | | |
|---|---|---|---|
| 7,519,807 B2 * | 4/2009 | Paul et al. | 713/2 |
| 7,558,958 B2 * | 7/2009 | Lieberman et al. | 713/176 |
| 7,565,517 B1 * | 7/2009 | Arbon | 713/1 |
| 2002/0161852 A1 | 10/2002 | Allen et al. | |
| 2003/0189929 A1 | 10/2003 | Matsuzaki et al. | |
| 2005/0097268 A1 | 5/2005 | Vollmer | |
| 2008/0288939 A1 * | 11/2008 | DeHaan | 717/177 |
| 2009/0119658 A1 * | 5/2009 | Thoon et al. | 717/173 |
| 2009/0133128 A1 * | 5/2009 | Uchikawa | 726/27 |
| 2009/0217025 A1 * | 8/2009 | Paul et al. | 713/2 |
| 2009/0222812 A1 * | 9/2009 | Nissen et al. | 717/173 |

* cited by examiner

APPROACH FOR PROVISIONING NETWORK DEVICES

RELATED APPLICATIONS AND CLAIM OF PRIORITY

This application claims benefit of Provisional Application Ser. No. 60/431,813, filed Dec. 8, 2002, entitled "Method and apparatus for provisioning of services on demand," by Martin Patterson, Shriram Krishnan, and Jayaraman Manni, the entire contents of which are incorporated by reference for all purposes as if fully set forth herein.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Provisioning of many network devices is conventionally performed by administrative personnel who manually configure network devices with a software "image" that may include an operating system and one or more applications. For example, an administrator may provision a generic computing platform as a Web server by installing an operating system, Web server software and one or more Web server management application programs. As used herein, the term "network device" refers to any type of network device. Example network devices include, without limitation, routers, hubs, gateways, switches, personal computers, workstations, and any other type of computing device. In some situations, network devices are re-provisioned. This may occur, for example, when a network device is to be used for a different purpose or in a different manner when a first or alternate use can be suspended or terminated. For example, suppose that the network device configured as a Web server is to be re-provisioned as a Web server with a different operating system. Conventionally, administrative personnel uninstall the initial operating system and install the new operating system. This may also require uninstalling application programs that are specific to the original operating system and then installing different versions of the operating system that are compatible with the new operating system. Network devices may be re-provisioned any number of times, depending upon the requirements of a particular operating environment.

Manually configuring network devices requires a significant amount of administrative resources and time, particularly for applications with large numbers of network devices. It also requires physical access to the network devices so that the new software can be loaded onto the network devices, which can be difficult for network devices disposed in remote locations.

SUMMARY

An approach for provisioning network devices generally involves supplying boot data to network devices over a network so that the network devices can be booted up in an imaging mode or an application mode, depending upon the particular boot data supplied to the network device. When booted up in the imaging mode, imaging data can be downloaded and stored on network devices. When booted up in the application mode, the network devices execute one or more programs contained in the image data stored on the network devices. The first and second boot data may be in the form of boot loader scripts. Furthermore, the first and second boot data may be provided to the network device in the payload of a dynamic host configuration protocol (DHCP) reply. The DHCP reply may be generated and provided by a DHCP server to the network device in response to receiving a DHCP request from the network device. The approach may be implemented using a secure network environment.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding embodiments of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. PROVISIONING ARCHITECTURE
    III. NETWORK DEVICE PROVISIONING
    IV. IMPLEMENTATION MECHANISMS I. Overview An approach for provisioning network devices generally involves supplying boot data to network devices over a network so that the network devices can be booted up in an imaging mode or an application mode, depending upon the particular boot data supplied to the network device. When booted up in the imaging mode, imaging data can be downloaded and stored on network devices. When booted up in the application mode, the network devices execute one or more programs contained in the image data stored on the network devices.

Figure 1:
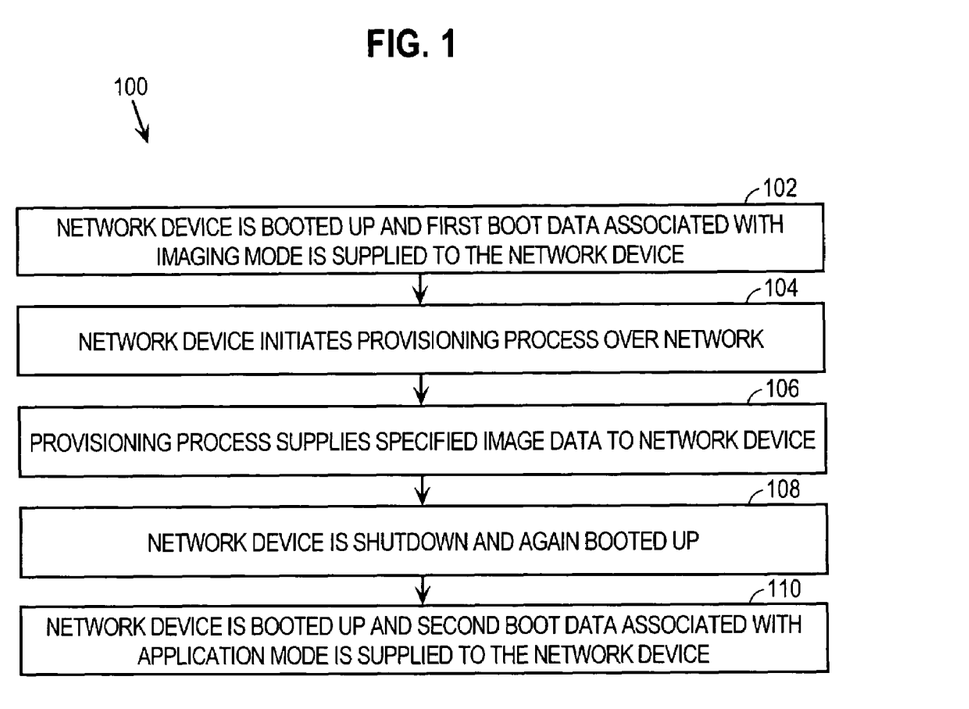
FIG. 1 is a flow diagram that depicts a high level approach for provisioning network devices according to an embodiment of the invention.

FIG. 1 is a flow diagram 100 that depicts a high level approach for provisioning network devices according to an embodiment of the invention. In step 102, a network device is booted up and first boot data associated with the imaging mode is supplied to the network device over a network. When processed by the network device, the first boot data causes the network device to boot up in the imaging mode.

In step 104, when booted up in the imaging mode, the network device initiates a provisioning process over the network. In step 106, the provisioning process supplies specified image data to the network device over the network. The specified image data includes one or more programs, such as an operating system or an application program.

In step 108, the network device is shutdown and again booted up. In step 110, when the network device boots up over the network, second boot data associated with the application mode is supplied to the network device. When processed by the network device, the second boot data causes the network device to boot up in the application mode. When booted up in the application mode, the network device executes one or more of the programs contained in the image data stored on the network device.

The first and second boot data may be in the form of boot loader scripts. Furthermore, the first and second boot data may be provided to the network device in the payload of a dynamic host configuration protocol (DHCP) reply. The DHCP reply may be generated and provided by a DHCP server to the network device in response to receiving a DHCP request from the network device. As described in more detail hereinafter, the approach may be implemented using a secure network environment.

The approach for provisioning network devices allows any number of network devices to be dynamically provisioned over a network without requiring physical access to the network devices.

II. Provisioning Architecture

Figure 2:
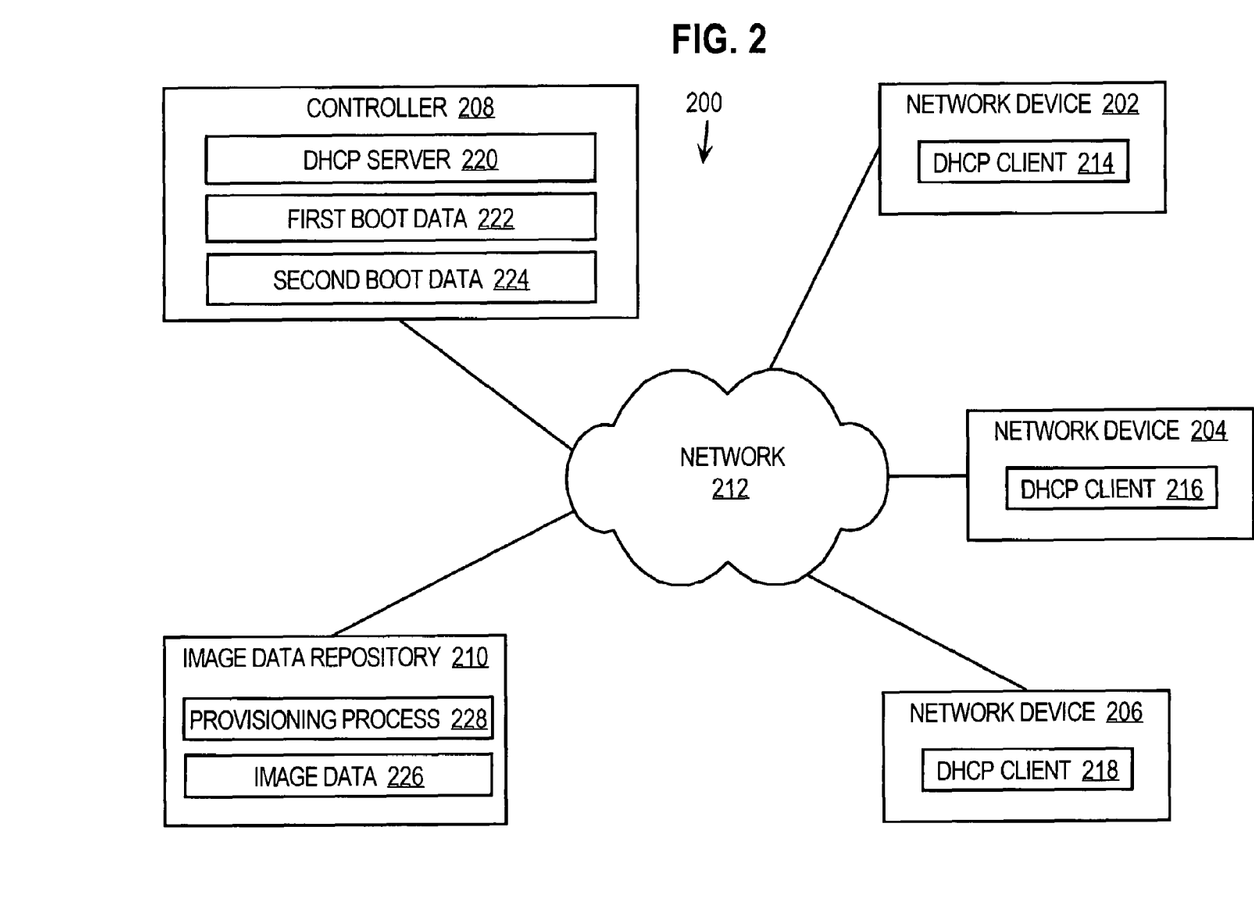
FIG. 2 is a block diagram that depicts an architecture for provisioning network devices according to one embodiment of the invention.

FIG. 2 is a block diagram that depicts an architecture 200 for provisioning network devices according to one embodiment of the invention. Architecture 200 includes a set of network devices 202, 204, 206 communicatively coupled to a controller 208 and an image data repository 210, via a network 212. Network 212 may be implemented using any medium and network elements that provide for the exchange of data between network devices 202, 204, 206, controller 208 and image data repository 210. For example, network 212 may include routers, hubs, switches and links. Network devices 202, 204, 206, controller 208 and image data repository 210 are depicted as being disposed external to network 212 for purposes of explanation only and any of these elements may be disposed internal to network 212, depending upon the characteristics of a particular implementation.

Network devices 202, 204, 206 may be any type of network device, depending upon the requirements of a particular application, and the invention is not limited to any particular type of network device. Example network devices include, without limitation, routers, hubs, gateways, switches, storage devices, personal computers, workstations and any other type of computing device. According to one embodiment of the invention, network devices 202, 204, 206 are configured with DHCP clients 214, 216, 218, respectively. DHCP clients 214, 216, 218 are configured to request IP addresses (static or dynamic) from controller 208. The use of DHCP clients 214, 216, 218 is described hereinafter.

Controller 208 is configured to provide automatic provisioning of network devices 202, 204, 206 in conjunction with image data repository, as described in more detail hereinafter. Controller 208 may be implemented by any type of processing mechanism, depending upon the requirements of a particular application. For example, controller 208 may be implemented in hardware, software, or any combination of hardware and software. According to one embodiment of the invention, controller 208 is configured with a DHCP server 220 that provides IP addresses in response to DHCP requests from DHCP clients 214, 216, 218. Controller 208 maintains first boot data 222 and second boot data 224 that are provided to network devices 202, 204, 206 during the provisioning process, as is described in more detail hereinafter.

Image data repository 210 is a data repository configured to manage image data 226 that is provided to network devices 202, 204, 206 during the provisioning process described herein. Image data 226 may include a wide variety of data, depending upon the particular implementation. Examples of image data 226 operating systems, application programs and configuration data. Image data repository 210 is also configured with a provisioning process 228 that is controlled by controller 208 to provision network devices 202, 204, 206, as described in more detail hereinafter. Image data repository 210 may be implemented by any type of data storage mechanism, depending upon the requirements of a particular application, and the invention is not limited to any particular type of storage mechanism. For example, image data repository 210 may be implemented using a generic computing platform with computer software or using a database management system.

III. Network Device Provisioning

Figure 3:
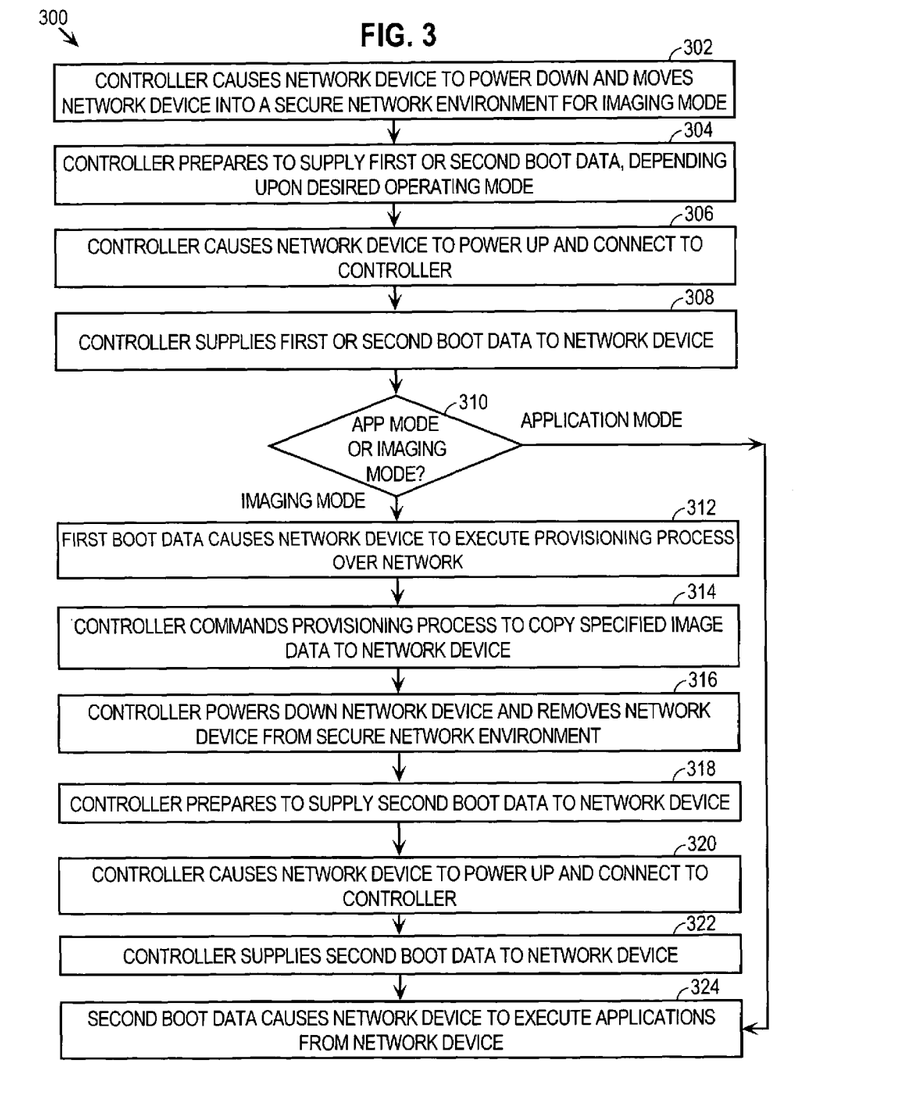
FIG. 3 is a flow diagram that depicts an approach for provisioning network devices according to an embodiment of the invention.

FIG. 3 is a flow diagram 300 that depicts an approach for provisioning network devices according to an embodiment of the invention. This example is described in the context of provisioning network device 202. In step 302, controller 208 causes network device 202 to transition from a powered up state to a powered down state, if network device 202 is not already in the powered down state. This may be performed, for example, by controller 208 sending a signal over network 212 to a power control card in network device 202. As another example, network device 202 may be configured with an agent that assists in transitioning network device 202 from a powered up state to a powered down state. If network device 202 is to be placed into the imaging mode for provisioning, then a secure network environment may be used. According to one embodiment of the invention, controller 208 moves network device 202 into a private VLAN. This may be performed, for example, by controller 208 updating the parameters for a switch in network 212 to assign the port to which network device 202 is connected to the private VLAN. The invention is not limited to using VLANs to provide a secure network environment and other techniques may be used, depending upon the requirements of a particular application.

In step 304, controller 208 prepares to supply to network device 202 either first boot data 222 or second boot data 224, depending upon the desired operating mode of network device 202. According to one embodiment of the invention, the first boot data causes network device 202 to boot up into an imaging mode that allows new image data to be loaded onto network device 202. The second boot data causes network device 202 to boot up into an application mode in which one or more programs are executed from the current image data on network device 202. The first and second boot data may be in any form, depending upon the requirements of a particular application, and the invention is not limited to any particular form. One example of boot data is a boot loader script that is executed by network device 202 during the boot up phase of network device 202.

The first and second boot data may be supplied by controller 208 to network device 202 using a variety of techniques and the invention is not limited to any particular technique. According to one embodiment of the invention, the first and second boot data is provided to network device 202 in DHCP messages. More specifically, DHCP server 220 is configured to provide the first and second boot data to network device 202 in the payload of a DHCP reply. The DHCP reply is generated in response to DHCP server 220 receiving a DHCP request from DHCP client 214 on network device 202.

In step 306, controller 208 causes network device 202 to power up and connect to controller 208 via network 212. Controller 208 uses signaling to cause network device 202 to transition from a powered down state to a powered up state. According to one embodiment of the invention, network device 202 is configured to boot up over network 212 from controller 208, with controller 208 acting as a network boot server. For example, the bios of network device 202 may be configured to cause network device 202 to boot up over network 212 instead of a local disk on network device 202.

In step 308, controller 208 supplies the first or second boot data to network device 202, depending upon whether network device is to be booted up in the imaging mode or the operating mode. In the context of using DHCP to supply boot data to network device 202, during the boot up sequence, DHCP client 214 prepares and sends a DHCP request to DHCP server 220. In response to receiving the DHCP request from DHCP client 214, DHCP server 220 generates and provides a DHCP reply to DHCP client 214 over network 212. The payload of the DHCP reply contains the first or second boot data, depending upon the desired operating mode of network device 202. The first and second boot data may be embodied in a boot loader script contained in the payload of the DHCP reply. At network device 202, the boot loader script is extracted from the DHCP reply and processed.

If, in step 310, the DHCP reply contains the second boot data, then as indicated by step 324, network device 202 boots up in the application mode. In the application mode, network device 202 executes one or more programs contained in the current image data maintained on network device 202. For example, network device 202 executes an operating system and one or more application programs contained in the image data on network device 202.

If, in step 310, the DHCP reply contains the first boot data, then as indicated by step 312, network device 202 boots up in the imaging mode. In the imaging mode, network device 202 initiates execution of provisioning process 228 over network 212, for example by making a call to provisioning process 228.

In step 314, controller 208 commands provisioning process to supply one or more portions of image data 226 to network device 202. Provisioning process 228 may be configured with a control path to allow controller 208 to issue commands. The control path may be implemented, for example, using tunneling, to provide secure communications. The portions of image data 226 supplied to network device 202 may include, for example, operating systems, application programs and configuration data. According to one embodiment of the invention, the portions of image data 226 supplied to network device 202 are selected based upon provisioning criteria. The provisioning criteria may include a wide variety of criteria and the invention is not limited to any particular criteria. Example provisioning criteria include, without limitation, customer requirements, load balancing, availability of software upgrades and business policies. The image data supplied to network device 202 may replace or supplement any image data already on network device 202. During an initial provisioning, network device 202 may not have any image data.

In step 316, controller 208 causes network device 202 to transition from the powered up state to the powered down state. Network device 202 is also moved out of the secure network environment. According to one embodiment of the invention, controller 208 moves network device 202 out of the private VLAN into another VLAN. This may be performed, for example, by controller 208 updating the parameters for a switch in network 212 to assign the port to which network device 202 is connected to another VLAN.

In step 318, controller 208 prepares to provide the second boot data to network device 202. In the context of using DHCP to supply boot data to network device 202, controller 208 reconfigures DHCP server 220 to provide the second boot data to network device 202.

In step 320, controller 208 causes network device 202 to transition from the powered down state to the powered up state. This may be performed, for example, by controller 208 signaling network device 202, or an agent executing on network device 202, to transition from the powered down state to the powered up state. As part of the boot up process, network device 202 connects to controller 208. In step 322, controller 208 provides the second boot data to network device 202. In the context of using DHCP to supply boot data to network device 202, DHCP client 214 generates and sends to DHCP server 220 a request for an IP address. In response to receiving the DHCP request from DHCP client 214, DHCP server 220 generates and provides a DHCP reply to network device 202. The DHCP reply includes the second boot data.

In step 324, the second boot data causes network device 202 to boot up in the application mode and executes one or more programs contained in the updated image data maintained on network device 202. Thereafter, network device 202 boots up in the application mode until a determination is made that the configuration of network device 202 needs to be updated. At that point, network device is re-booted in imaging mode as described herein so that new imaging data can be downloaded to network device 202.

The aforementioned steps are not all required by the invention, nor in the order presented. For example, in some applications, a determination may be made that it is not necessary to move a network device into a VLAN during provisioning. In this situation, it may not be necessary to move network device 202 into the private VLAN in step 302 and move network device 202 out of the private VLAN in step 316. In addition, although this example is depicted in the figures and described in the context of using DHCP to provide boot data to network device 202, the use of DHCP is not required and other protocols and transport methods may be used.

Although embodiments of the invention have been depicted and described in the context of provisioning a single network device, the approach may be used to provision any number of network devices. For example, the approach may be used to dynamically provision network devices 202, 204, 206 simultaneously or individually. The approach also allows dynamic provisioning of network devices over a network without requiring physical access to the network devices.

IV. Implementation Mechanisms

Figure 4:
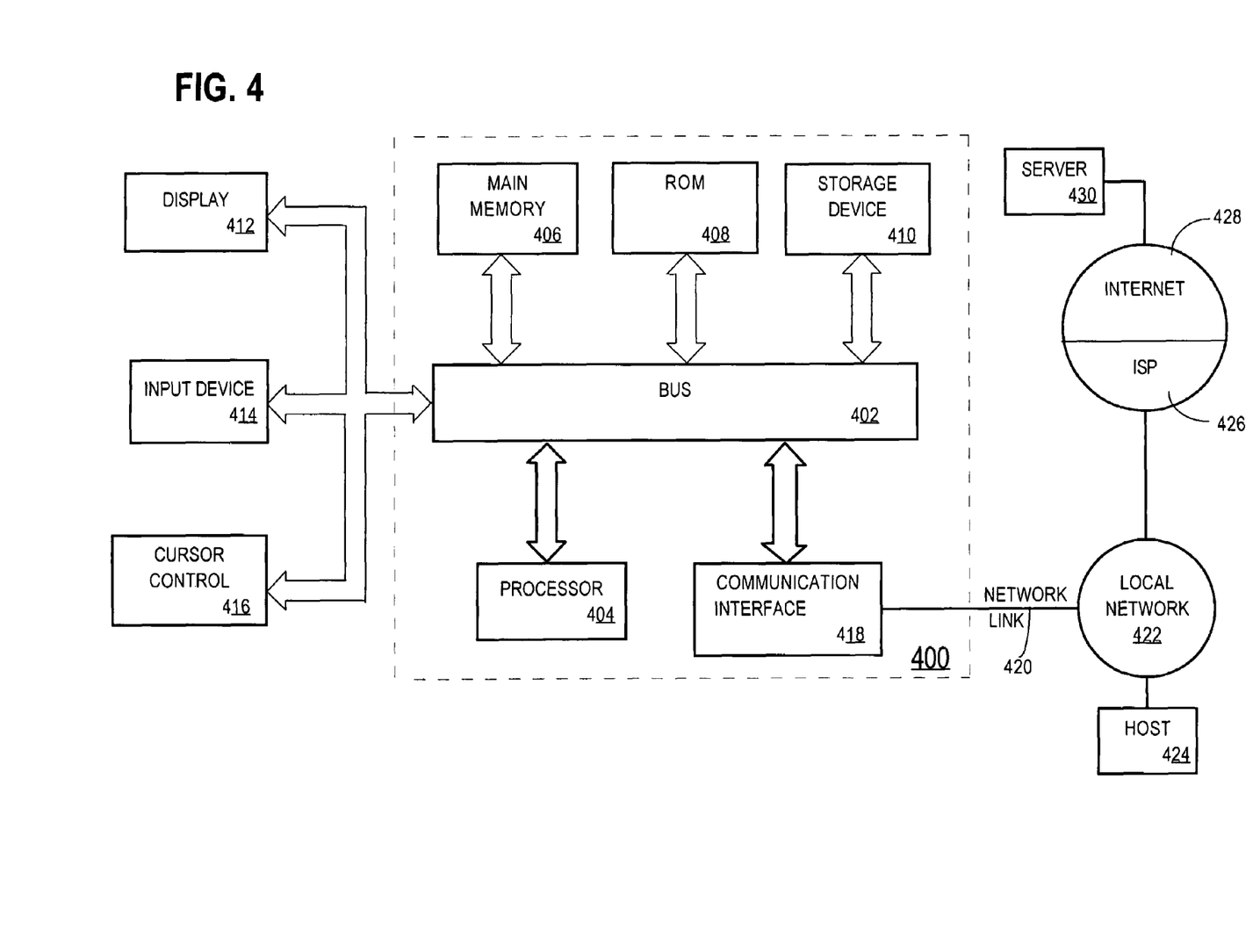
FIG. 4 is a block diagram of an example computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute the code as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for configuring a network device, the apparatus comprising a memory configured to store instructions which, when executed by one or more processors, cause the one or more processors to perform the steps of:

powering up the network device, wherein the network device is associated with a private virtual local area network (VLAN) prior to being powered up;

supplying, after powering up the network device, first boot data to the network device over a network, wherein processing of the first boot data by the network device during a first startup of the network device causes the network device to bootup in image mode and, once in image mode, execute a provisioning process over the network;

instructing the provisioning process to supply at least one computer program to the network device over the network;

powering down the network device after receiving the at least one computer program;

re-configuring, after powering down the network device after receiving the at least one computer program, the network to remove the network device from the private VLAN;

powering up, after re-configuring the network, the network device; and supplying, after powering up the network device, second boot data to the network device over the network, wherein processing of the second boot data by the network device during a second startup of the network device causes the network device to bootup in application mode and to execute the at least one computer program, wherein the first boot data is a first boot loader script and the second boot data is a second boot loader script.

2. The apparatus as recited in claim 1, wherein the steps of supplying the first boot data to the network device over the network and supplying the second boot data to the network device over the network are performed using dynamic host configuration protocol (DHCP).

3. The apparatus as recited in claim 1, wherein the first boot data is supplied to the network device over the network in a payload portion of a dynamic host configuration protocol (DHCP) reply generated and sent to the network device in response to receiving a DHCP request from the network device over the network.

4. The apparatus as recited in claim 1, wherein the at least one computer program includes an operating system.

5. The apparatus as recited in claim 1, wherein the memory further comprises one or more additional instructions which, when executed by the one or more processors, cause the one or more processors to perform the step of selecting the image data to be supplied to the network device based upon provisioning criteria.

6. The apparatus as recited in claim 1, wherein the memory further comprises one or more additional instructions which, when executed by the one or more processors, cause the one or more processors to perform the steps of:

supplying, over the network, the first boot data to a second network device that is different than the network device, wherein processing of the first boot data by the second device during a first startup of the second network device causes the second network device to execute the provisioning process over the network;

instructing the provisioning process to supply second image data to the second network device, wherein the second image data is different than the first image data and includes at least one other computer program; and supplying the second boot data to the second network device, wherein processing of the second boot data by the second network device during a second startup of the second network device causes the second network device to execute at least one of the one or more other computer programs contained in the second image data.

7. The apparatus as recited in claim 1, wherein the step of instructing the provisioning process to supply image data to the network device over the network includes instructing the provisioning process to cause the image data to be retrieved from an image data repository and supplied to the network device over the network.

8. A method for configuring a network device in a network, the method comprising the machine-implemented steps of:

powering up the network device, wherein the network device is associated with a private virtual local area network (VLAN) prior to being powered up;

supplying, after powering up the network device, first boot data to the network device over the network, wherein processing of the first boot data by the network device during a first startup of the network device causes the network device to bootup in image mode and, once in image mode, to execute a provisioning process over the network;

instructing the provisioning process to supply image data to the network device over the network, wherein the image data includes at least one computer program;

powering down the network device after receiving the at least one computer program;

re-configuring, after powering down the network device after receiving the at least one computer program the network to remove the network device from the private VLAN powering up, after re-configuring the network, the network device; and supplying, after powering up the network device, second boot data to the network device over the network, wherein processing of the second boot data by the network device during a second startup of the network device causes the network device to bootup in application mode and to execute the at least one computer program contained in the image data, wherein the first boot data is a first boot loader script and the second boot data is a second boot loader script.

9. The method as recited in claim 8, wherein the steps of supplying the first boot data to the network device over the network and supplying the second boot data to the network device over the network are performed using dynamic host configuration protocol (DHCP).

10. The method as recited in claim 8, wherein the first boot data is supplied to the network device over the network in a payload portion of a dynamic host configuration protocol (DHCP) reply generated and sent to the network device in response to receiving a DHCP request from the network device over the network.

11. The method as recited in claim 8, wherein the at least one computer program includes an operating system.

12. The method as recited in claim 8, further comprising the machine-implemented step of selecting the image data to be supplied to the network device based upon provisioning criteria.

13. The method as recited in claim 8, further comprising the machine-implemented steps of:

supplying, over the network, the first boot data to a second network device that is different than the network device, wherein processing of the first boot data by the second device during a first startup of the second network device causes the second network device to execute the provisioning process over the network;

instructing the provisioning process to supply second image data to the second network device, wherein the second image data is different than the first image data and includes at least one other computer program; and supplying the second boot data to the second network device, wherein processing of the second boot data by the second network device during a second startup of the second network device causes the second network device to execute at least one of the one or more other computer programs contained in the second image data.

14. The method as recited in claim 8, wherein the step of instructing the provisioning process to supply image data to the network device over the network includes instructing the provisioning process to cause the image data to be retrieved from an image data repository and supplied to the network device over the network.

15. A machine-readable medium for configuring a network device in a network, the machine-readable medium carrying instructions which, when executed by one or more processors, cause the one or more processors to perform the steps of:
- powering up the network device, wherein the network device is associated with a private virtual local area network (VLAN) prior to being powered up;
- supplying, after powering up the network device, first boot data to the network device over the network, wherein processing of the first boot data by the network device during a first startup of the network device causes the network device to bootup in image mode and, once in image mode, to execute a provisioning process over the network;
- instructing the provisioning process to supply image data to the network device over the network, wherein the image data includes at least one computer program;
- powering down the network device after receiving the at least one computer program;
- re-configuring, after powering down the network device after receiving the at least one computer program, the network to remove the network device from the private VLAN
- powering up, after re-configuring the network, the network device; and
- supplying, after powering up the network device, second boot data to the network device over the network, wherein processing of the second boot data by the network device during a second startup of the network device causes the network device to bootup in application mode and to execute the at least one computer program contained in the image data,
- wherein the first boot data is a first boot loader script and the second boot data is a second boot loader script.

16. The machine-readable medium as recited in claim 15, wherein the steps of supplying the first boot data to the network device over the network and supplying the second boot data to the network device over the network are performed using dynamic host configuration protocol (DHCP).

17. The machine-readable medium as recited in claim 15, wherein the first boot data is supplied to the network device over the network in a payload portion of a dynamic host configuration protocol (DHCP) reply generated and sent to the network device in response to receiving a DHCP request from the network device over the network.

18. The machine-readable medium as recited in claim 15, wherein the at least one computer program includes an operating system.

19. The machine-readable medium as recited in claim 15, further comprising one or more additional instructions which, when executed by the one or more processors, cause the one or more processors to perform the step of selecting the image data to be supplied to the network device based upon provisioning criteria.

20. The machine-readable medium as recited in claim 15, further comprising one or more additional instructions which, when executed by the one or more processors, cause the one or more processors to perform the steps of:
- supplying, over the network, the first boot data to a second network device that is different than the network device, wherein processing of the first boot data by the second device during a first startup of the second network device causes the second network device to execute the provisioning process over the network;
- instructing the provisioning process to supply second image data to the second network device, wherein the second image data is different than the first image data and includes at least one other computer program; and
- supplying the second boot data to the second network device, wherein processing of the second boot data by the second network device during a second startup of the second network device causes the second network device to execute at least one of the one or more other computer programs contained in the second image data.

21. The machine-readable medium as recited in claim 15, wherein the step of instructing the provisioning process to supply image data to the network device over the network includes instructing the provisioning process to cause the image data to be retrieved from an image data repository and supplied to the network device over the network.

* * * * *